Sept. 15, 1970
C. CAPPELEN, JR
3,528,550
DIALYSIS WATER SYSTEM
Filed June 27, 1968
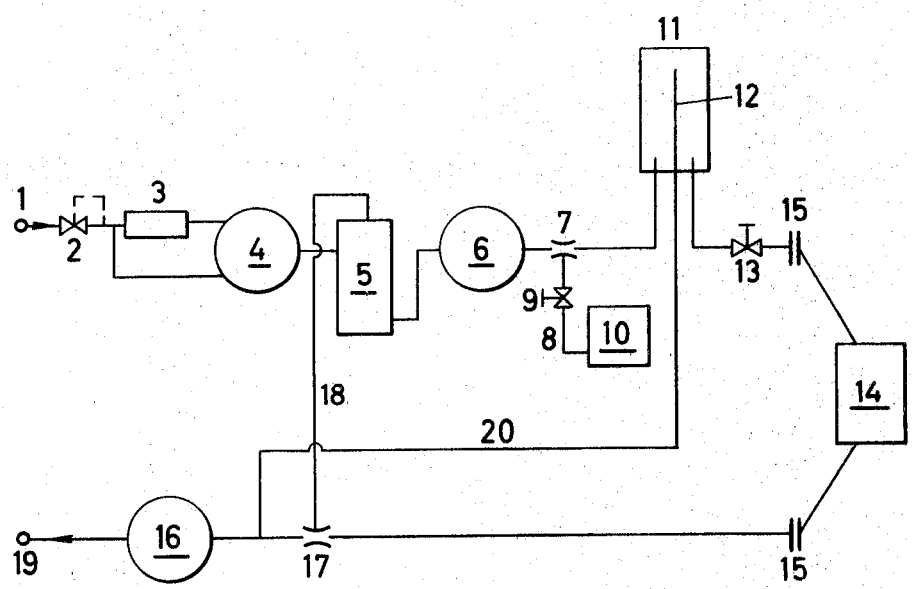
Inventor
Christian Cappelen, Jr.
BY Watson, Cole, Grindle & Watson
Attorneys

United States Patent Office 3,528,550
Patented Sept. 15, 1970

3,528,550
DIALYSIS WATER SYSTEM
Christian Cappelen, Jr., Oslo, Norway, assignor to A/S Nycotron, Oslo, Norway
Filed June 27, 1968, Ser. No. 740,541
Claims priority, application Norway, July 4, 1967, 168,933
Int. Cl. B01d 13/00, 31/00
U.S. Cl. 210—180                                   2 Claims

ABSTRACT OF THE DISCLOSURE

Apparatus for use with a dialysis-type artificial kidney machine utilizes the vacuum generated by passing the used dialysis liquid from the artificial kidney machine through a venturi which vacuum is applied to a degassing device through which fresh dialysis liquid passes before being fed into the artificial kidney machine whereby any entrained gas contained in the fresh dialysis liquid is removed.

---

The present invention relates to a dialysis water system, for the production of dialysis liquid for use in dialysis apparatus for the treatment, in hospital or domestically, of patients suffering from cronic or acute nephralgia.

In so called artificial kidneys, the blood of the patient is passed in a very thin layer between two diaphragms which, on the opposite side are bathed with a dialysis liquid, a dialysis taking place through the diaphragms, the blood thereby emitting such substances which are accumulated during urine poisoning, at the same time as a correction is taking place of the liquid and electrolyte disarrangements which might be present in the blood system. The diaphragms are therefore passing substances in both directions. Consequently, it is of the greatest importance that the composition of the dialysis liquid be correct, and in particular it is of importance that it does not contain any air. Obviously, the arrangement of the diaphragms with intermediary layers of blood, and flushed by dialysis liquid may be multiplied, when required.

If, by way of example, it is presumed that a dialyzer having four blood layers is used, it may contain about 50 ml. blood, which for the purpose of a satisfactory dialysis would need a very great quanttiy of dialysis liquid, upwards to several hundred liters. Even if it might be possible to produce a satisfactory liquid in a thermostatically controlled tank, obviously a series of practical circumstances are prevailing which dictate a continuous production of dialysis liquid, on the basis of a concentrate which is admixed with tap water, in correct proportion and at the correct temperature.

The present invention relates to a system for the production of dialysis liquid, a system which may be adapted to a simple dialysis apparatus, for the personal use of the patient, or for attachment to a number of such apparatus, for use in hospitals, and the object of the invention in particular is to ensure that the dialysis liquid is air free when entering the dialysis apparatus proper.

According to the invention this is achieved by passing the dialysis liquid, upon having been passed through the dialysis apparatus and then through a venturi device which, by means of a conduit, is connected to a degassing device for the liquid, positioned upstream of the dialysis apparatus. As, the dialysis liquid is pumped through the dialysis apparatus, the liquid flow will, as in a water jet pump, draw air from the degassing device so that the liquid when arriving at the dialysis apparatus will be air and gas free, and there wil be no danger of gas diffusion through the diaphragms of the apparatus.

In accordance with the invention, such an air suction arrangement is included in a dialysis liquid system, which is adapted to be connected to a dialysis apparatus having diffusion in layers between blood and liquid, and a characteristic feature of this system is that the same comprises a degassing tank through which conveniently temperate tap water is carried before being admixed to dialysis liquid concentrate.

In accordance with a further feature of the invention, the passage of the idalysis liquid through the dialysis apparatus is ensured by means of a suction pump which is arranged at the downstream side of the dialysis apparatus and which draws liquid from a tank which is arranged on the upstream side of the apparatus, through a choke and stop valve.

The accompanying drawing schematically illustrates a system incorporating the present invention In the drawing, 1 is a water tap connection, while 2 is a reduction valve for controlling the pressure of the water introduced into the system. Though not shown in the drawing, fiilter devices may be incorporated upstream of the valve 2.

From the valve 2, the water is fed in two parallel runs, one to a heating device 3 and then to a thermostatically controlled mixing valve 4 and the other directly to thermostatically controlled mixing valve 4 wherein the temperature of the water leaving this valve is set to body temperature, or slightly above the same, in view of later heat losses before the water arrives in the dialysis apparatus proper.

From the mixing valve 4, the water is fed to a degassing device 5, in which air, which might be contained in the water, is removed, and further to a suction pump 6, the pressure side of which is connected to a venturi device 7, which through a conduit 8 including a stop valve 9, draws dialysis liquid concentrate from the storage tank 10 and mixes water and concentrate thereby forming a liquid of physiologically correct concentration.

The dialysis liquid so prepared is fed to a tank 11, provided with an overflow 12 and a choke valve 13, and is thence delivered to the dialysis apparatus proper, which in the drawing is only indicated at 14 with its connection points 15. The delivery from the tank 11 and the passing through the dialysis apparatus is secured by a suction pump 16, which is arranged at the downstream side of the apparatus. At the suction side of the pump 16, a venturi device 17 is mounted which, through a conduit 18 is connected to the degassing device 5, so that the latter is always subjected to a vacuum so that all air which might be contained in the water supply is drawn out by means of the flow of dialysis liquid after it has performed its function in the dialysis apparatus. From the venturi device 17, the liquid, together with the gases absorbed by the same, is carried through the pump 16 to the drain 19. The overflow 12 of the tank 11 is connected by conduit 20 to the liquid with absorbed gases flowing into pump 16.

Without being indicated in the drawing the system obviously is provided with control and supervision instruments, in particular for temperature, pressure and concentration, which are the essential parameters of a safe performance of the system so that the valve 13 and thereby the connection to the dialysis apparatus is automatically and momentarily closed at any deviation from predetermined marginal values of the essential parameters.

I claim:

1. Apparatus for use with artificial kidney machines for obtaining gas-free dialysis liquid for use in said artificial kidney machines which operate on the dialysis principle comprising inlet and discharge condiut means connected to said artificial kidney for feeding fresh dialysis liquid to said artificial kidney machine and discharging used dialysis liquid from said artificial kidney machine, respectively a venturi connected to said discharge conduit means, a degassing device connected to said inlet conduit means and a suction conduit connecting said venturi to said degassing device, whereby used dialysis liquid passing through said venturi causes a vacuum to be applied to said fresh dialysis liquid to remove entrained gas therefrom before said fresh dialysis liquid enters said artificial kidney machine.

2. Apparatus as claimed in claim 1 wherein means is provided in said inlet conduit means to control the temperature of said fresh dialysis liquid.

References Cited

UNITED STATES PATENTS 3,406,826  10/1968  Willock _____ 210—321 X
3,441,136  4/1969  Serfass et al. ____ 210—321 XR REUBEN FRIEDMAN, Primary Examiner R. A. SPEAR, Jr., Assistant Examiner U.S. Cl. X.R.

210—321